(12) United States Patent
Iley et al.

(10) Patent No.: US 7,926,044 B2
(45) Date of Patent: *Apr. 12, 2011

(54) METHOD, APPARATUS AND COMPUTER PROGRAM FOR EXECUTING A PROGRAM

(75) Inventors: Adam D Iley, Southampton (GB); John J R Scott, Newton Aycliffe (GB)

(73) Assignee: International Business Machines Corporation, Armonk, NY (US)

( * ) Notice: Subject to any disclaimer, the term of this patent is extended or adjusted under 35 U.S.C. 154(b) by 751 days.

This patent is subject to a terminal disclaimer.

(21) Appl. No.: 11/967,454

(22) Filed: Dec. 31, 2007

(65) Prior Publication Data

US 2008/0104372 A1   May 1, 2008

Related U.S. Application Data

(63) Continuation of application No. 10/782,674, filed on Feb. 19, 2004, now Pat. No. 7,343,595.

(30) Foreign Application Priority Data

Aug. 30, 2003 (GB) .................................. 0320386.6

(51) Int. Cl.
   *G06F 9/44* (2006.01)
(52) U.S. Cl. ........................................................ 717/131
(58) Field of Classification Search .................. 717/131
   See application file for complete search history.

(56) References Cited

U.S. PATENT DOCUMENTS

| | | | |
|---|---|---|---|
| 5,669,000 A | 9/1997 | Jessen et al. | |
| 5,751,981 A | 5/1998 | Witt et al. | |
| 5,911,060 A * | 6/1999 | Elliott | 718/100 |
| 5,913,925 A | 6/1999 | Kahle et al. | |
| 6,173,442 B1 | 1/2001 | Agesen et al. | |
| 6,367,070 B1 | 4/2002 | Haghighat et al. | |
| 6,425,120 B1 | 7/2002 | Morganelli et al. | |
| 6,425,121 B1 | 7/2002 | Phillips | |
| 6,530,079 B1 * | 3/2003 | Choi et al. | 717/158 |
| 6,539,541 B1 | 3/2003 | Geva | |
| 6,634,023 B1 | 10/2003 | Komatsu et al. | |
| 6,651,243 B1 * | 11/2003 | Berry et al. | 717/130 |
| 6,728,955 B1 * | 4/2004 | Berry et al. | 717/158 |
| 6,760,903 B1 | 7/2004 | Morshed et al. | |
| 6,874,139 B2 * | 3/2005 | Krueger et al. | 717/127 |
| 6,931,631 B2 | 8/2005 | Bates et al. | |
| 6,961,925 B2 | 11/2005 | Callahan, II et al. | |

(Continued)

OTHER PUBLICATIONS

Cui et al., "Parallel replacement mechanism for multithread", IEEE, 1997, pp. 338-344.

(Continued)

*Primary Examiner* — Philip Wang
(74) *Attorney, Agent, or Firm* — Yee & Associates, P.C.; David A. Mims, Jr.

(57) ABSTRACT

There is provided a method for executing a program comprising a function call and one or more subsequent instructions. The method comprises processing, on a first thread, a function defined by the function call, the function having one or more programmer predefined typical return values. For each predefined return value, the one or more subsequent instructions are pre-processed on an additional thread assuming that the function returned that pre-defined return value. In this way the processor, on completion of processing said function is able to make use of the pre-processing completed by the additional thread which used the actual return value.

6 Claims, 4 Drawing Sheets

U.S. PATENT DOCUMENTS

| | | | |
|---|---|---|---|
| 6,961,930 | B1 | 11/2005 | Waldspurger et al. |
| 6,964,043 | B2 | 11/2005 | Wu et al. |
| 7,010,787 | B2 | 3/2006 | Sakai |
| 7,082,601 | B2 | 7/2006 | Ohsawa et al. |
| 7,117,481 | B1 | 10/2006 | Agesen et al. |
| 7,143,401 | B2 | 11/2006 | Babaian et al. |
| 7,152,170 | B2 | 12/2006 | Park |
| 2002/0055964 | A1 | 5/2002 | Luk et al. |
| 2002/0144083 | A1 | 10/2002 | Wang et al. |

OTHER PUBLICATIONS

Li et al., "A framework of reachability testing for Java multithread programs", IEEE, 2004, pp. 2730-2734.

Matsuzaki et al., "A multithread processer architecture based on the continuation model", IEEE IWIA, 2005, pp. 1-8.

Manson et al., "Core semantics of multithread Java", ACM JAVA, 2001, pp. 29-38.

Tardieu et al., "Scheduling independent threads and exceptions in SHIM" ACM EMSOFT, 2006, pp. 142-151.

Schwan et al., "Multiprocessor real time threads", ACM SIGOPS, vol. 26, issue 1, 1992, pp. 54-65.

Serrano et al., "Scheme fair threads", ACM PPDP, 2004, pp. 203-214.

Roth et al., "Speculative Data-Driven Multithreading", Jan. 2001, pp. 1-12.

Aamodt et al., "The Predictability of Computations that Product Unpredictable Outcomes", Dec. 2001, pp. 23-34.

Zilles et al., "Understanding the Backward Slices of Performance Degrading Instructions", Jun. 2000.

Young et al., A Comparative Analysis of Schemes for Correlated Branch Prediction, Jun. 1995 pp. 1-11.

Young et al., "Static Correlated Branch Prediction", 1999, pp. 111-159.

* cited by examiner

```
resticted (late, very late) library()
{
    while (more users)
    {
        determine status of user's book if not overdue
        {
            do nothing
        }
        if late
        {
            remind_late_user(user)
        } if very late
        {
            remind_very_late(user)
        }
    } while(more letters)
    {
    send_letter_to_printer(letter)
    }
} restricted remind_late_user(user)
{
    lookup user's address, book name; number of days overdue by; outstandin
    fine; waiting list; borrower history
    calculating fine due
    retrieve late text
    build letter in volatile memory

} restricted remind_very_late_user(user)
{
    lookup user's address; book name; number of days overdue by, ,waiting list
    calculating fine due
    retrieve very late text
    build letter in volatile memory
} send_letter_to_printer(letter)
{
    print letter}
```

Figure 1 }

METHOD, APPARATUS AND COMPUTER PROGRAM FOR EXECUTING A PROGRAM

This application is a continuation of application Ser. No. 10/782,674, filed Feb. 19, 2004, now U.S. Pat. No. 7,343,595 status, allowed.

FIELD OF THE INVENTION

The invention relates to speculative pre-execution of portions of a computer program.

BACKGROUND OF THE INVENTION

Computers have proliferated into all aspects of society and in today's increasingly competitive market-place, the performance of not only the machines themselves but also the software that runs on these machines, is of the utmost importance. Software developers are therefore continually looking for methods to improve the execution efficiency of the code (programs) they produce in order to meet the high expectations of software users.

One such method is by inserting pre-execution instructions into source code such that execution of such instructions cause a portion of the program defined by the source code to be pre-executed. This is described in US Patent Application Publication US 2002/0055964.

Further, US Patent Application Publication US 2002/0144083 describes a processor using spare hardware contexts to spawn speculative threads such that data is pre-fetched in advance of a main thread.

Another known method is "branch prediction" (also mentioned in US 2002/0055964). Within a program there are typically a number of branch points. These are points which can return one of a finite number of results. Prediction techniques are used to determine the likely return result such that a branch point's subsequent instructions can be pre-executed on this assumption. "if . . . else" statements and "case" statements are two well known examples of branch points.

There are a number of branch prediction techniques known in the industry. Such techniques are common in RISC and processor architectures (e.g. The pSeries architecture). See alsowww.mtl.t.u-tokyo.ac.jp/~niko/Downloads/chitaka-EuroPar 2001-PerThreadPredictor.pdf which presents a hardware scheme for improving branch prediction accuracy.

Software schemes also exist. A paper "Static Correlated Branch Prediction" by Cliff Young and Michael D Smith (ACM Transactions on Programming Languages and Systems, Vol. 21. No ?, ??? 1999, Pages 111-159) describes how the repetitive behaviour in the trace of all conditional branches executed by a program can be exploited by a compiler. Another paper "A Comparative Analysis of Schemes for Correlated Branch Prediction" by Cliff Young, Michael D Smith and Nicholas Gloy (published in the Proceedings of the 22nd Annual International Symposium on Computer Architecture, June 1995) presents a framework that categorizes branch prediction schemes by the way in which they partition dynamic branches and by the kind of predictor they use.

The paper "Understanding Backward Slices of Performance Degrading Instructions" by C Zilles and G Sohi (published in the proceedings of the 27th Annual International Symposium on Computer Architecture (ISCA-2000), Jun. 12-14, 2000) discusses the small fraction of static instructions whose behaviour cannot be anticipated using current branch predictors and caches. The paper analyses the dynamic instruction stream leading up to these performance degrading instructions to identify the operations necessary to execute them early.

Another paper "The Predictability of Computations that Produce Unpredictable Outcomes" by T Aamodt, A Moshovos and P Chow (an update of the paper that appeared in the Proceedings of the 5th Workshop on Multithreaded Execution, Architecture, and Compilation—pages 23-34, Austin, Tex., December 2001) studies the dynamic stream of slice traces that foil existing branch predictors and measures whether these slices exhibit repetition.

"Speculative Data-Driven Multithreading" by Amir Roth and Gurindar Sohi (appearing in the Proceedings of the 7th International Conference on High Performance Computer Architecture (HPCA-7), Jan. 22-24, 2001) describes the use of speculative data-driven multithreading (DDMT) for coping with mispredicted branches and loads that miss in the cache.

It is also known for the programmer to be able to provide branch prediction pragma—see http://www.geocrawler.com/archives/3/357/1993/7/0/1992785/.

Whilst branch prediction techniques are known, there is however a need in the industry for more efficient processing of software functions as opposed to branch points.

SUMMARY

Accordingly the invention provides a method for executing a program comprising a function call and one or more subsequent instructions, the method comprising the steps of: processing, on a first thread, a function defined by the function call, the function having one or more programmer predefined typical return values; for each predefined return value, preprocessing, on an additional thread, the one or more subsequent instructions assuming that the function returned that pre-defined return value, thereby enabling said processor, on completion of processing said function, to make use of the pre-processing completed by the additional thread which used the actual return value.

Thus the present invention enables a programmer to define typical return values for a function such that the function can be pre-processed ahead of a main thread. Assuming that the function does actually return one of the predefined return values, performance can be much improved.

Note, preferably the additional threads operate in parallel.

Preferably the program comprises a plurality of subsequent instructions defining one or more additional functions and the plurality of subsequent instructions are pre-processed on each additional thread until a function is reached which is of external effect. Once such a function is reached by an additional thread that thread preferably blocks (waits) on said function until the actual return value is determined by the first thread.

Preferably each additional thread also blocks on reaching a function which is affected by an external event.

According to one aspect the invention provides an apparatus for executing a program comprising a function call and one or more subsequent instructions, the apparatus comprising: means for processing, on a first thread, a function defined by the function call, the function having one or more programmer predefined typical return values; means for pre-processing for each predefined return value, on an additional thread, the one or more subsequent instructions assuming that the function returned that pre-defined return value, thereby enabling said processor, on completion of processing said function, to make use of the pre-processing completed by the additional thread which used the actual return value.

The invention may be implemented in computer software.

According to another aspect, the invention provides a compiler for generating a computer program comprising a function call defining a function, having one or more programmer predefined typical return values, and one or more subsequent instructions, the compiler comprising means for generating executable code, said executable code for instructing a computer to process on a first thread the function and to pre-process, for each defined typical return value, on an additional thread the one or more subsequent instructions assuming that the function returned that pre-defined return value, thereby enabling said processor, on completion of processing said function, to make use of the pre-processing completed by the additional thread which used the actual return value.

It will be appreciated that the term compiler is intended to cover the whole compilation process optionally including linking.

BRIEF DESCRIPTION OF THE DRAWINGS

A preferred embodiment of the present invention will now be described, by way of example only, and with reference to the following drawings:

FIG. 1 illustrates an extract of psuedo code incorporating the new construct provided by a preferred embodiment of the present invention;

DETAILED DESCRIPTION

Figure 2A:
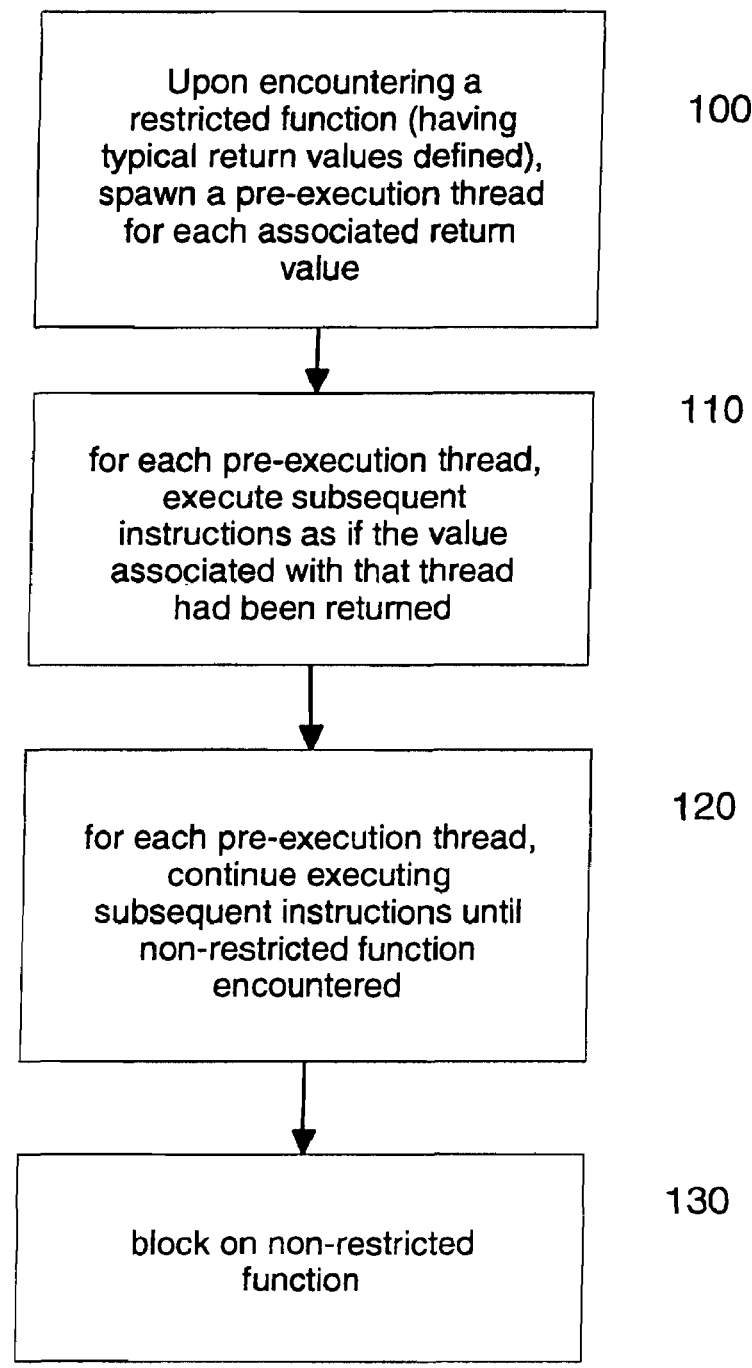
FIG. 2a shows the processing of spawned pre-execution threads in accordance with a preferred embodiment of the present invention.

It has been observed that within a program certain tasks (functions) require substantial amounts of processing time but frequently return the same result. In order to exploit this observation a new construct is preferably incorporated into existing programming languages. This construct enables programmers to mark certain functions as "restricted". In this context, the keyword "restricted" preferably means that the marked function does not effect the global environment (e.g. by outputting to a file) and the syntax associated with the new keyword permits the values most commonly returned by the function to be specified by the programmer as part of the function's signature. Further preferably, a "restricted" function is not itself affected by the global environment. In other words, it always operates in the same way regardless of the results produced by other "restricted" functions.

FIG. 1 shows an extract of pseudo code from a library program incorporating the new "restricted" keyword in accordance with a preferred embodiment of the present invention. The extract of library program shown includes two main functions: overdue; and send_letter_to_printer. The overdue function is marked as "restricted" since it does not affect the global environment. By contrast the send_letter_to__printer function results in printer output and does not therefore have the "restricted" keyword associated with it.

From the code extract, it can be seen that the overdue function checks the status of each user's book to determine whether that book is: not yet due back at the library; is late back; or is very late back. If a user's book is not overdue, then the function does no processing in relation to that user. On the other hand, if a user's book is either late or very late, then the remind_late or remind_very_late function is called as appropriate.

Whilst the overdue function itself is thus relatively fast, both remind functions have long and complicated processing to do on behalf of the user in relation to which that function is called. This processing involves looking up the user's address; the name of the overdue book; the number of days the book is overdue by; and the list of those currently waiting for the book. If the book is very late, then the user's borrower history must also checked. Further, in both cases the outstanding fine has to be calculated and the appropriate letter text retrieved. All this information is then used to build an appropriate letter in memory for eventual dispatch to the user.

Whilst the processing of both remind functions is long and complicated, this processing also does not affect the global environment. Values are retrieved and held in volatile memory, but no data is inserted, updated, deleted or output to non-volatile memory, an external device etc. Thus these functions can also be marked as "restricted", although in this instance it is not appropriate to associate either function with typical return values.

Once letters have been built in non-volatile memory for all user's with overdue books, then these letters are sent to the printer via the "send_to_printer" function. This function is not marked as "restricted" since it does effect the global environment.

The execution of code including the new "restricted" keyword will now be described with reference to FIGS. 2a and 2b.

FIG. 2a shows the processing of pre-execution threads in accordance with a preferred embodiment of the present invention. Upon encountering a restricted function having typical return values defined (as described above), a pre-execution thread is spawned for each such return value (step 100). For each such pre-execution thread, instructions subsequent to the restricted function are executed as if the restricted function did indeed return the value associated with the particular pre-execution thread (step 110). In other words, the restricted function is not actually executed. Instead, for each pre-execution thread, it is assumed that the function returned one of the predefined values. Each pre-execution thread then continues executing instructions until a non-restricted function is encountered (step 120). As discussed above, non-restricted functions affect the global environment via, for example, updating data; inserting data; deleting data; or outputting results. Thus each pre-execution thread then blocks on the non-restricted function until the true result of the original "restricted" function is determined by a main thread (step 130).

Note, as alluded to with reference to FIG. 1, not all "restricted" functions have typical return values associated therewith. For example, the remind functions do not since they rely upon the results returned by the overdue function.

Further, rather than spawning pre-execution threads, a thread pool may be used.

Figure 2B:
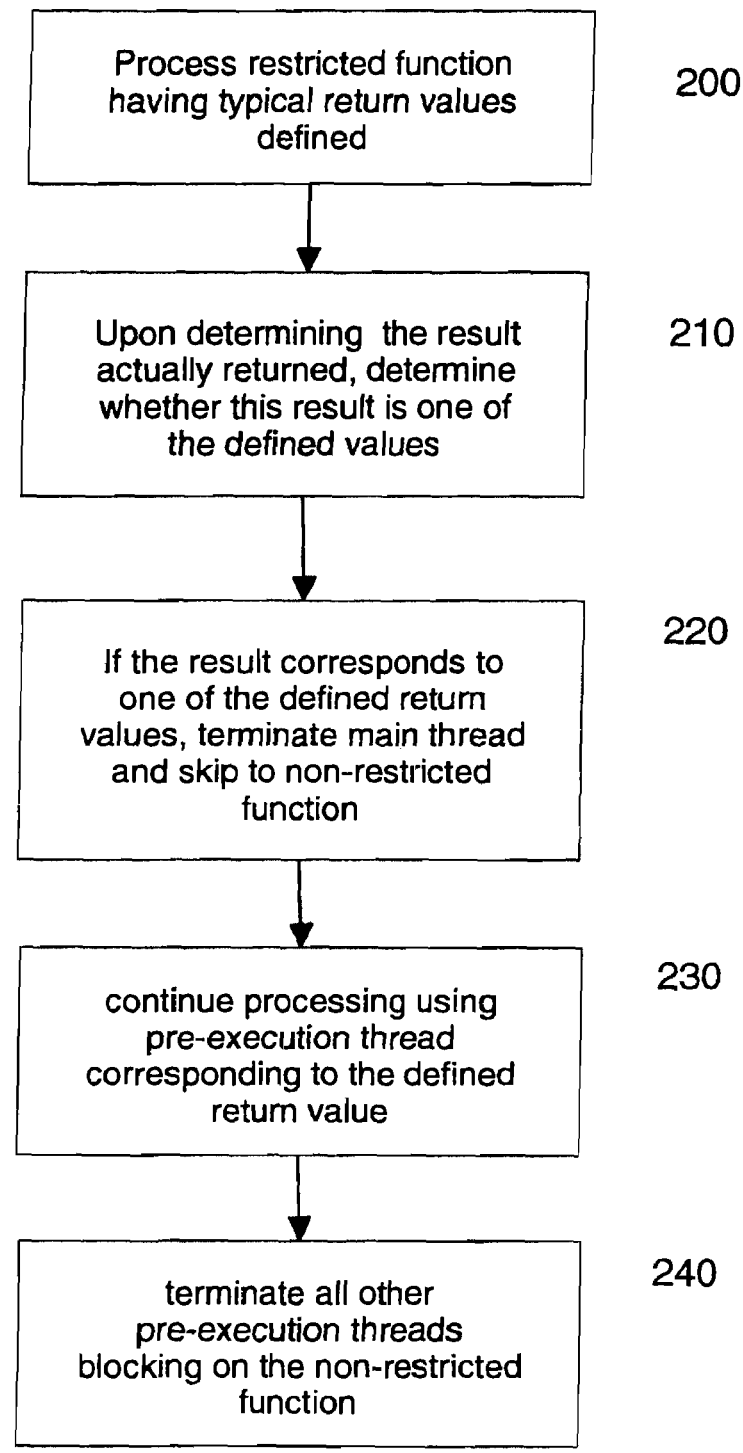
FIG. 2b shows the processing of a main thread in accordance with a preferred embodiment of the present invention.

FIG. 2b shows the processing of a main thread in accordance with a preferred embodiment of the present invention. The main thread processes a "restricted" function having typical return values defined (step 200). Upon determining the result actually returned by this function, the main thread determines whether this result corresponds to one of the defined return values associated with the "restricted" function (step 210). Assuming that the return value does correspond to one of the defined return values, then the main thread is terminated and execution skips to the non-restricted function (step 220). Execution then continues using the pre-execution thread associated with the actual return value (step 230). All other pre-execution threads are terminated (step 240).

Thus by enabling the programmer to define functions with non-global effect/as not affected by the global environment and also typical return values for such functions, it is possible to speculatively pre-execute code. Assuming that the speculation proves correct, program execution performance can be dramatically improved—a pre-execution thread will have preferably performed the long and complicated processing in the background whilst the main thread is performing other tasks.

Note, in one embodiment the main thread is not finally terminated until it is verified that an appropriate pre-execution does exist. Indeed it may be the main thread that is responsible for terminating those pre-execution threads that are not associated with the correct return value.

Another example of a system in which the invention should prove useful is a menu system in which a program will display a number of menu options and then wait for the user to choose one. In accordance with the "restricted" construct defined by a preferred embodiment of the present invention, the programmer can define the options most likely to be selected and then the program can pre-execute each of those options as far as it can (i.e. until a global function is encountered).

As discussed above, the functionality of the present invention is preferably achieved by modification of existing programming languages. Executable programs are typically produced from compiled source code. The compilation process is thus modified such that the meaning of "restricted" keyword is understood and such that appropriate executable code is generated as a result of the compilation process.

Figure 3:
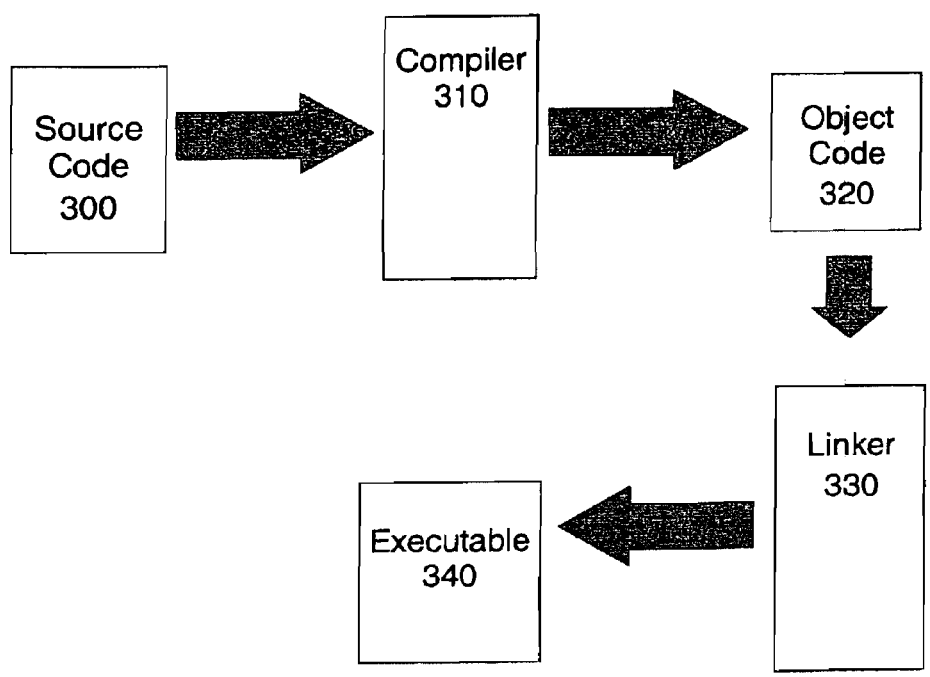
FIG. 3 illustrates the operation of a compiler in accordance with a preferred embodiment of the present invention.

Thus for completeness the operation of a compiler in accordance with a preferred embodiment of the present invention is described with reference to FIG. 3.

A compiler 310 is provided with a program's source code 300 as input. The compiler processes this source code to produce object code 320 and this is then passed to a linker 330 which uses this code 320 to produce an executable 340.

Typically, there are three stages to the compilation process: lexical analysis; syntax analysis; and code generation. During the lexical analysis, symbols (e.g. alphabetic characters) are grouped together to form tokens. For example the characters P R I N T are grouped to form the command (token) PRINT. In some systems, certain keywords are replaced by shorter, more efficient tokens. This part of the compilation process also verifies that the tokens are valid.

In accordance with a preferred embodiment of the present invention, the lexical analyser is therefore modified to recognise "restricted" as a keyword and also to recognise expected return values when the programmer provides them.

Next, the syntax analyser checks whether each string of tokens forms a valid sentence. Again the syntax analyser is preferably modified to recognise that "restricted" keyword and the predefined typical return values are valid.

Finally, the code generation stage produces the appropriate object code. The code generator is thus also preferably modified to recognise the new "restricted" construct such that the appropriate object code is generated for any program employing the new construct (i.e. to achieve the result discussed with reference to FIGS. 2a and 2b.)

It is assumed that a person skilled in the art of compiler development will be familiar with the above process and thus this will not be discussed in any further detail.

The invention claimed is:

1. An apparatus for executing a program comprising a function call and one or more subsequent instructions, the apparatus comprising:
    means for processing, on a first thread, a function defined by the function call, the function having at least two predefined typical return values;
    means for pre-processing for each predefined return value, on an additional thread, the one or more subsequent instructions which are associated with a given predefined return value, wherein said pre-processing is performed concurrent with the processing of the first thread; and,
    means, responsive to completion of the processing of said function on said first thread, wherein said function returns an actual return value upon said completion, for continuing processing of the additional thread associated with the actual return value while terminating at least one other additional thread that is not associated with the actual return value, such that the one or more subsequent instructions associated with the actual return value are speculatively executed prior to (i) the completion of the processing of said function and (ii) the return of the actual return value by said function.

2. The apparatus of claim 1, wherein the program comprises a plurality of subsequent instructions defining one or more additional functions, the apparatus further comprising:
    means for pre-processing on each additional thread the plurality of subsequent instructions until a function is reached which is of external effect; and
    means for blocking on said function having external effect until the actual return value is determined by the first thread.

3. The apparatus of claim 2, wherein the blocking means is operable to also block on reaching a function which is affected by an external event.

4. A computer program product, stored on a computer, comprising:
    computer-readable program code for processing, on a first thread, a function defined by the function call, the function having at least two programmer predefined typical return values;
    computer-readable program code for pre-processing on an additional thread, the one or more subsequent instructions which are associated with a given predefined return value for each predefined return value, wherein said pre-processing is performed concurrent with the processing of the first thread; and
    computer-readable program code for processing the additional thread associated with an actual return value while terminating at least one other additional thread that is not associated with the actual return value, such that the one or more subsequent instructions associated with the actual return value are speculatively executed prior to the completion of the processing of said function and the return of the actual return value by said function in response to completion of the processing of said function on said first thread, wherein said function returns the actual return value upon said completion.

5. A compiler for generating the computer-readable program code means of claim 4.

6. An apparatus for executing a program comprising a function call and a plurality of subsequent instructions, the apparatus comprising:
    means for processing, on a first thread, a function defined by the function call, the function having a plurality of predefined typical return values;
    means for pre-processing for each predefined return value, on an additional thread, certain ones of the subsequent instructions which are associated with a given predefined return value until a non-restricted function having an external effect is encountered, wherein said preprocessing is performed for each additional thread concurrent with the processing of the first thread; and means, responsive to completion of the processing of said function on said first thread, wherein said function return an actual return value upon said completion, for continuing processing of the additional thread associated with the actual return value while terminating (1) other additional threads that are not associated with the actual return value and (2) the first thread, such that the certain ones of the subsequent instructions associated with the actual return value are speculatively executed prior to (i) the completion of the processing of said function and (ii) the return of the actual return value by said function.

* * * * *